United States Patent [19]
Cole et al.

[11] Patent Number: 5,094,534
[45] Date of Patent: Mar. 10, 1992

[54] COHERENCE SELECTIVE FIBER OPTIC INTERFEROMETRIC SENSOR SYSTEM

[75] Inventors: James H. Cole, Great Falls, Va.; Ira J. Bush, Los Angeles, Calif.

[73] Assignee: Dylor Corporation, Chantilly, Va.

[21] Appl. No.: 457,975

[22] Filed: Dec. 27, 1989

[51] Int. Cl.⁵ ............................................. G01B 9/02
[52] U.S. Cl. .................................. 356/345; 356/358; 250/227.19
[58] Field of Search ............... 356/345, 352, 358, 360; 250/227.19

[56] References Cited

U.S. PATENT DOCUMENTS

| | | | |
|---|---|---|---|
| 4,596,466 | 6/1986 | Ulrich et al. | 356/345 |
| 4,740,081 | 4/1988 | Martens et al. | 356/345 |
| 4,772,786 | 9/1988 | Langdon et al. | 356/352 |
| 4,918,492 | 4/1990 | Ferdinand et al. | 356/345 |

FOREIGN PATENT DOCUMENTS 0091210 5/1985 Japan ................................. 356/345

OTHER PUBLICATIONS

Brooks et al. Coherent Multiplexing of Fiber-Optic Interferometric Sensors, IEEE Journal of Lightwave Technology, vol. LT-3, No. 5 (Oct. 1985).
Bush et al. Synchronous Phase Detection for Optical Fiber Interfermetric Sensors, Applied Optics vol. 22, No. 15, p. 2329 (Aug. 1, 1983).
Chen et al—Short-Coherence-Length and High-Coupling-Efficiency Pulsed Diode Laser for Fiber Optic Sensors—Optics Letters, vol. 3, No. 8 at p. 628 (Aug. 1988).

Primary Examiner—Samuel Turner
Attorney, Agent, or Firm—Reed Smith Shaw & McClay

[57] ABSTRACT

A fiber optic interferometric sensor system utilizing a reference transducer and an optical source having a very short coherence length, typically about 80 microns. The optical source is used to activate a remotely located fiber optic sensor which has an optical path defference between two reflecting surfaces such that the reflected optical beams are incoherent for the optical source used. The reflected beams are then coupled to a reference transducer, located remotely from the sensor and preferably near the electronic processing circuitry. The reference transducer is designed with an optical path length difference to produce a coherent combination for the optical path length differences of both the sensor and the reference transducer thereby forming a highly sensitive interferometer.

23 Claims, 4 Drawing Sheets

COHERENCE SELECTIVE FIBER OPTIC INTERFEROMETRIC SENSOR SYSTEM

FIELD OF THE INVENTION

The present invention relates to fiber optic interferometric sensor systems and more particularly to ones utilizing a reference transducer and an optical source having a very short coherence length.

BACKGROUND OF THE INVENTION

Fiber optic sensors can be used for many sensing applications, including automotive, medical, security and industrial processing. Fiber optic interferometric sensors can provide the highest performance of any fiber optic sensor, however, fiber optic interferometric sensors require electronic processing to convert the optical information inscribed in the sensor to a linear electrical output. Thus, electronic circuitry is associated with fiber optic interferometric sensors.

Fiber optic sensors are considerably more attractive for sensing applications when the sensor can be remotely deployed with the electronic processing and the reference transducer separated and removed from the sensor. Coherence multiplexing of fiber optic interferometric sensors has been utilized with highly coherent sources as described by Brooks et al., "Coherent Multiplexing of Fiber-Optic Interferometric Sensors," IEEE Journal of Lightwave Technology, Vol. LT-3, No. 5 at p. 1062, (October 1985). Large coherence lengths (° 4.5m), however, are not compatible with small sensor designs. Moreover, these highly coherent sources are typically single mode or quasi-single mode laser diodes.

It is desirable, therefore, and there is described in this specification, a fiber optic interferometric sensor system which utilizes short or very small coherence lengths (on the order of 100 microns) and wherein the reference transducer and the electronic processing circuits are located remotely from the sensor.

SUMMARY OF THE INVENTION

Generally, the present invention provides a fiber optic interferometric sensor system for measuring displacements induced on a small sensor or transducer. In one embodiment for use in medical applications, an acoustic sensor operating into the 100's of kilohertz region has been demonstrated. Clearly, any measured field such as temperature, acceleration, etc., which can be coupled to a displacement can potentially be implemented in a coherence selective sensor. The sensor system measures signals over a large dynamic range while maintaining a high degree of linearity. The system converts incoherent optical information from any remotely deployed optical fiber sensor to coherent information through the use of a local reference transducer which also allows for closed loop operation. The present invention also utilizes low coherence sources (i.e., ones having short coherence lengths) providing for extremely small sensor size. These low coherence sources also exhibit low noise characteristics and thus provide a high sensitivity capability. For example, broadband sources operating at 1.3 micron wavelengths can attain performance to better than 4 microradians per root hertz performance. If multi-longitudinal line laser diodes exhibiting the proper coherence function and low relative intensity noise ($R_{in}$) are used, performance better than 2 microradians per root hertz can be achieved.

The present invention utilizes a low coherent optical source (typically having a coherence length of about 80 microns) to eliminate coherent recombination of the optical beams within very small, remotely deployed sensor packages. A reference transducer is incorporated into the system which, preferably, is located remotely from the sensor. The optical fiber length between the sensor and the electronics is limited only by the fiber loss, providing excellent remote operation. The reference transducer has an optical path length which is matched to that of the sensor, and in conjunction with the sensor forms a single coherent interferometric output. Electronic processing is done locally on the signal from the reference transducer providing improved fiber optic sensor system performance for measuring small displacements induced on the sensor. The small size of the Coherence Selective Sensor coupled with the high sensitivity and remote operation, provides an ideal sensor for interventional acoustic measurements and signal analysis in the human heart. The small sensors can be deployed through a catheter in an artery, allowing internal measurements to be taken with minimal risk to the patient. The present invention has a wide range of potential applications since it can be used with sensor transducers which convert almost any signal. For example, it can be used with a sensor transducer which converts acceleration into displacement.

The present invention also enables closed loop servo processing to be used on the sensor system. Such processing provides linearity over a large dynamic range. As an example, signal linearity of over 150 dB is possible with such closed loop servo systems. The use of low coherence length sources in conjunction with a local reference transducer provide extremely small sensors having a high sensitivity and large linear operation.

The present invention comprises a small fiber optic sensor which detects a displacement generated by signals of interest applied to it. The fiber optic sensor although small, has an optical path difference between two reflecting surfaces such that the reflected optical beams are incoherent for the optical source utilized. Upon reflection of the source light from the two reflecting surfaces of the remotely located sensor, the two light beams travel backwards along the same fiber used by the source to illuminate the sensor. The two beams are then coupled to a reference transducer which is designed with an optical path length difference to produce, or select, a coherent combination for the optical path differences of both the sensor and reference transducer. Neither the sensor nor the transducer produces a coherent output independently. Thus a highly sensitive interferometer is formed, consisting of the combination of the local reference transducer and the remote sensor. The reference transducer provides the opportunity to locally control the interferometer in a closed loop manner ensuring optimal performance.

Other details, objects and advantages of the present invention will become more readily apparent from the following description of a preferred embodiment thereof.

BRIEF DESCRIPTION OF THE DRAWINGS

In the accompanying drawings, a preferred embodiment of the present invention is illustrated, by way of example only, wherein.

DETAILED DESCRIPTION OF THE PREFERRED EMBODIMENT

Figure 1:
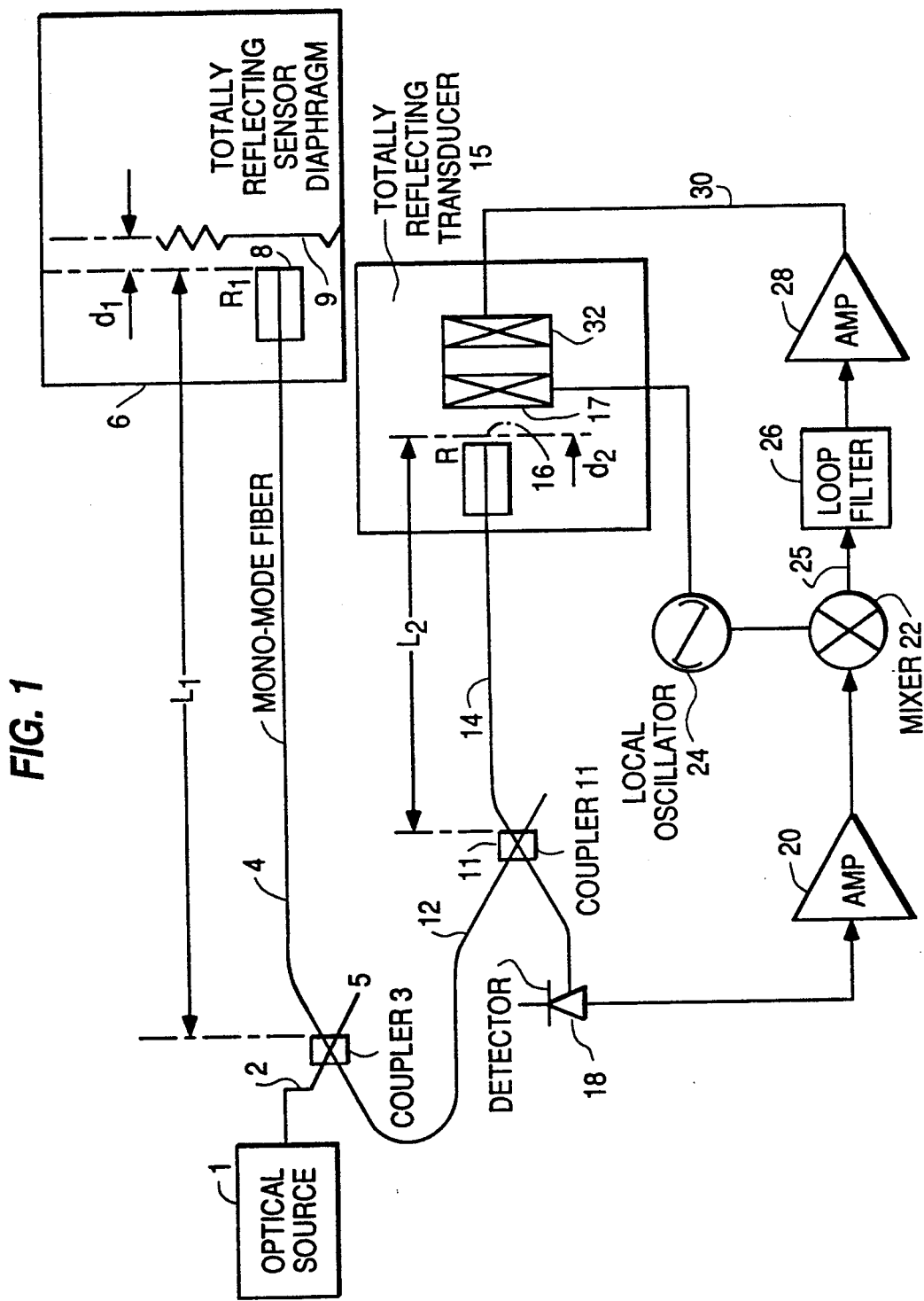
FIG. 1 is a block diagram of a fiber optic sensor system of the present invention.

As shown in FIG. 1, an optical source 1 provides light to a single mode fiber 2 which is coupled to a first fiber coupler 3 which acts as a fiber directional power splitter. Fiber coupler 3 splits the light and directs it into two output fibers 4 and 5. The light directed into fiber 5 from coupler 3 is not used in the embodiment as shown in FIG. 1, but it could be used for monitoring purposes. Alternatively, as will be discussed below with reference to FIG. 4, the output can be used in connection with a photo detector. The light from the upper port of coupler 3 is directed into the fiber 4 and propagates along fiber 4 an arbitrary length $L_1$ limited only by the loss of the fiber to a remotely located fiber optic sensor 6.

Figure 2:
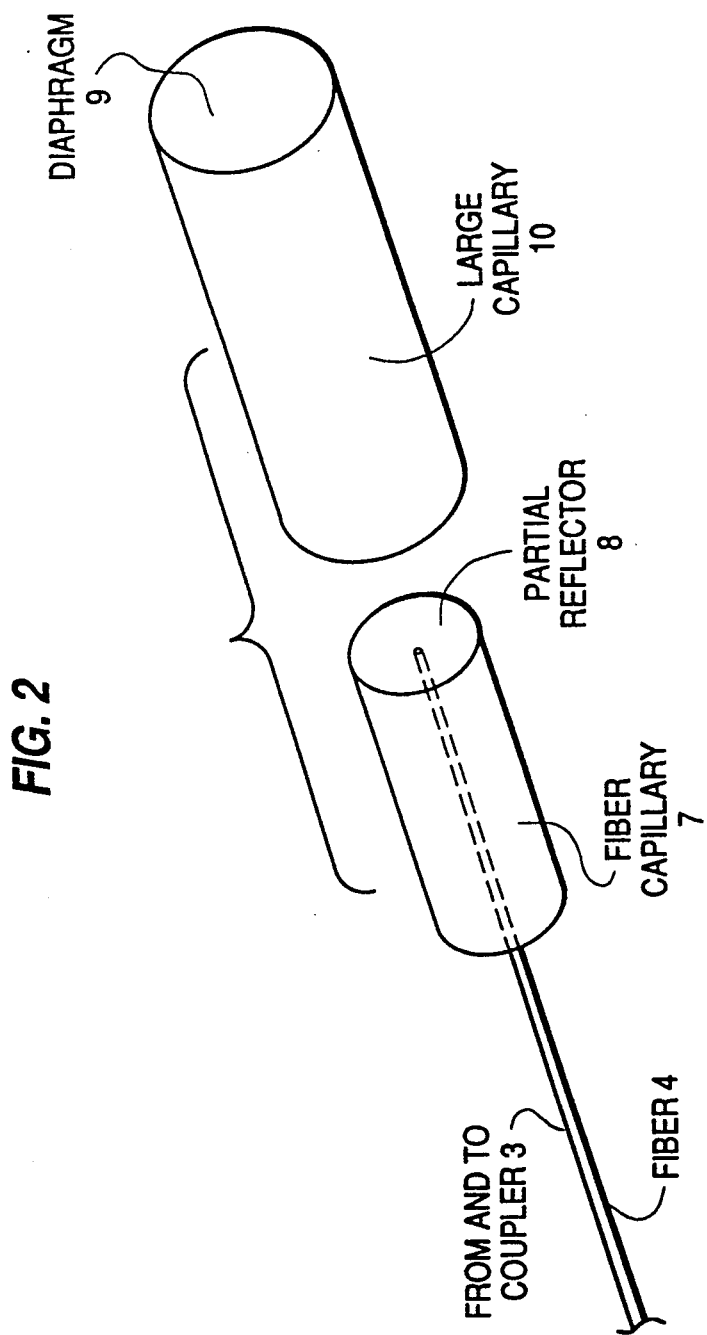
FIG. 2 shows a fiber optic sensor for use in the system of the present invention.

The fiber optic sensor 6 may be constructed as shown in FIG. 2 by mounting the fiber 4 in a glass capillary 7 and polishing the combined fiber and capillary flat. Depending on the application, capillaries of outside diameter from 0.25 to 4 mm can be used. A partially reflective surface 8 is optically coated with, for example, a dielectric coating to create the partial reflection. This partially reflective fiber surface produces the first optical signal reflected from the sensor back along the fiber 4. For an acoustic sensor, a highly reflective diaphragm surface 9 is fabricated from a polyester membrane approximately 0.5 to 5 microns thick and separated from the partially reflective surface 7 by a gap $d_1$. The membrane or diaphragm may be mounted to an external structure 10 which may then be attached to the capillary holding the fiber. In practice, the external structure 10 is also a capillary of a larger diameter than the fiber capillary 7. Capillaries for the larger structure may vary from 0.3 to 6 mm in size. In the preferred approach, the diaphragm is attached with adhesive to the flat end of the larger capillary, with the highly reflective surface 9 preferably on the inside. The large capillary 10 is slid over the fiber capillary 7 to form the air gap $d_1$ between the reflective surfaces and then glued into place. A second gap can be left in the adhesive to provide static pressure relief. Alternate pressure relief techniques could include a hole or notch in the larger capillary 10, or even holes in the diaphragm.

The alignment of the two capillaries is such that a reflection from the totally reflective diaphragm provides the second reflection along fiber 4 for the optical sensor. The air gap $d_1$ between the two reflective surfaces of the sensor is approximately 50 microns for the embodiment used in a medical application.

An alternate approach would be to coat the fiber 4 with the partially reflective coating and then mount the fiber in the capillary. Yet another approach could use an uncoated fiber attached to a graded index lens (such as those provided by NSG America) with the end of the lens appropriately coated to provide the partially reflective surface. The larger capillary 10 would then mount over the selfoc lens. And another approach would be to use a concave polish on the fiber capillary to form a gap, of approximately 50 microns between the fiber at the center of the capillary surface 8 to the end of the capillary. Because of the excellent tolerances associated with optical polishing, the reflective diaphragm surface 9 can be mounted directly to the capillary end providing a high degree of accuracy and repeatability for the gap distance.

Many alternative approaches are possible in light of these teachings. For example, convex polishing is possible as are a variety of mechanical implementations not utilizing capillaries.

The light transmitted from the partial reflective surface is airborne for a short distance $d_1$, the size of the gap between the partially reflective fiber surface 8 and the totally reflective diaphragm surface 9. It is desired that a large portion of both reflected light beams be coupled back into fiber 4. This produces two guided waves propagating in the reverse direction in fiber 4 towards the coupler 3. When these light waves encounter coupler 3, a portion of the light is directed to the optical source 1 and the other portion is directed to a second fiber coupler 11 by a connecting fiber 12. The fiber length between couplers 3 and 11 is usually of the order of 1 meter, however, the length of the fiber connecting the two couplers is limited only by the loss of the fiber 12. Light from the coupler 11 is propagated down a fiber 14 to a reference transducer 15. The fiber 14 may be of any arbitrary length $L_2$ which is limited only by the loss of the fiber. As with the remote sensor 6, this reference transducer 15 is provided with a partially reflecting surface 16 which reflects part of the light back along fiber 14. Light is also transmitted across an air gap of distance $d_2$ and a sufficient portion is reflected back by a reflective surface 17. These reflected light waves are also reverse propagated in the fiber 14 to the coupler 11. As with the coupler 3, a portion of the reverse propagated light on coupler 11 is transmitted by the connector fiber 12 towards the source 1 through coupler 3. The remainder is made incident on a light detector 18 where it is converted to an electrical analog. The configuration thus described constitutes a four beam interferometer.

The four paths can be described using the following expressions (which ignore the common paths from the source 1 to coupler 3, coupler 3 to coupler 11, and coupler 9 to the detector 18):

$$\text{Path 1} = 2L_1 + 2d_1 + 2L_2 + 2d_2 \quad \text{(I)}$$
$$\text{Path 2} = 2L_1 + 2L_2 + 2d_2$$
$$\text{Path 3} = 2L_1 + 2d_1 + 2L_2$$
$$\text{Path 4} = 2L_1 + 2L_2.$$

The light travelling through these four paths interfere, producing 6 interference terms which are:

$$
\begin{aligned}
&1.\ E_1^2 + E_2^2 + 2V_{1,2}E_1E_2 \cos[k(2d_1)] \quad \text{(II)}\\
&2.\ E_1^2 + E_3^2 + 2V_{1,3}E_1E_3 \cos[k(2d_2)]\\
&3.\ E_1^2 + E_4^2 + 2V_{1,4}E_1E_4 \cos[k(2d_1 + 2d_2)]\\
&4.\ E_2^2 + E_3^2 + 2V_{2,3}E_2E_3 \cos[k(2d_1 + 2d_2)]\\
&5.\ E_2^2 + E_4^2 + 2V_{2,4}E_2E_4 \cos[k(2d_2)]\\
&6.\ E_3^2 + E_4^2 + 2V_{3,4}E_3E_4 \cos[k(2d_1)]
\end{aligned}
$$

wherein:

$E_n$ = the electric field amplitude for path N
$V_{x,y}$ = the visibility (correlation) coefficient for fields x and y
$k$ = the free space wave number ($K = 2\pi/\lambda$)
$\lambda$ = the wavelength of the optical source.

Inspection of the 6 interference terms shows that all the phase terms come from the air gaps in the sensor 6 and the transducer 15. It has been assumed that polarization or birefringence effects are negligible for the air gaps and that the reflections are normal.

The ideal optical source 1 for this configuration is a white light source. This is a source which has a very short coherence length. If $d_1=d_2$, and the white light source is used, then $V_{1,2}=V_{1,3}=V_{1,4}=V_{2,4}=V_{3,4}=0$ and $V_{2,3}$ is approximately one. This greatly simplifies the six interference terms leaving only one interference expression with a value, namely the fourth term. Rewriting the expression under these conditions results in:

$$P_{det} = 3E_1^2 + 3E_2^2 + 3E_3^2 + 3E_4^2 + 2E_2E_3 \cos[k(2d_1 - 2d_2)] \quad (III)$$

At present, there are no commercially available white light sources which can produce an ideal white light source having any appreciable power coupling into a single mode fiber. A device which closely resembles the spectral characteristics of a white light source, however, is a light emitting diode (LED). Most LEDs are surface emitting devices having emitting surfaces greater than 50 microns wide. These devices, however, do not couple much light into a single mode fiber and are impractical for use in a coherence selective sensor.

Figure 3:
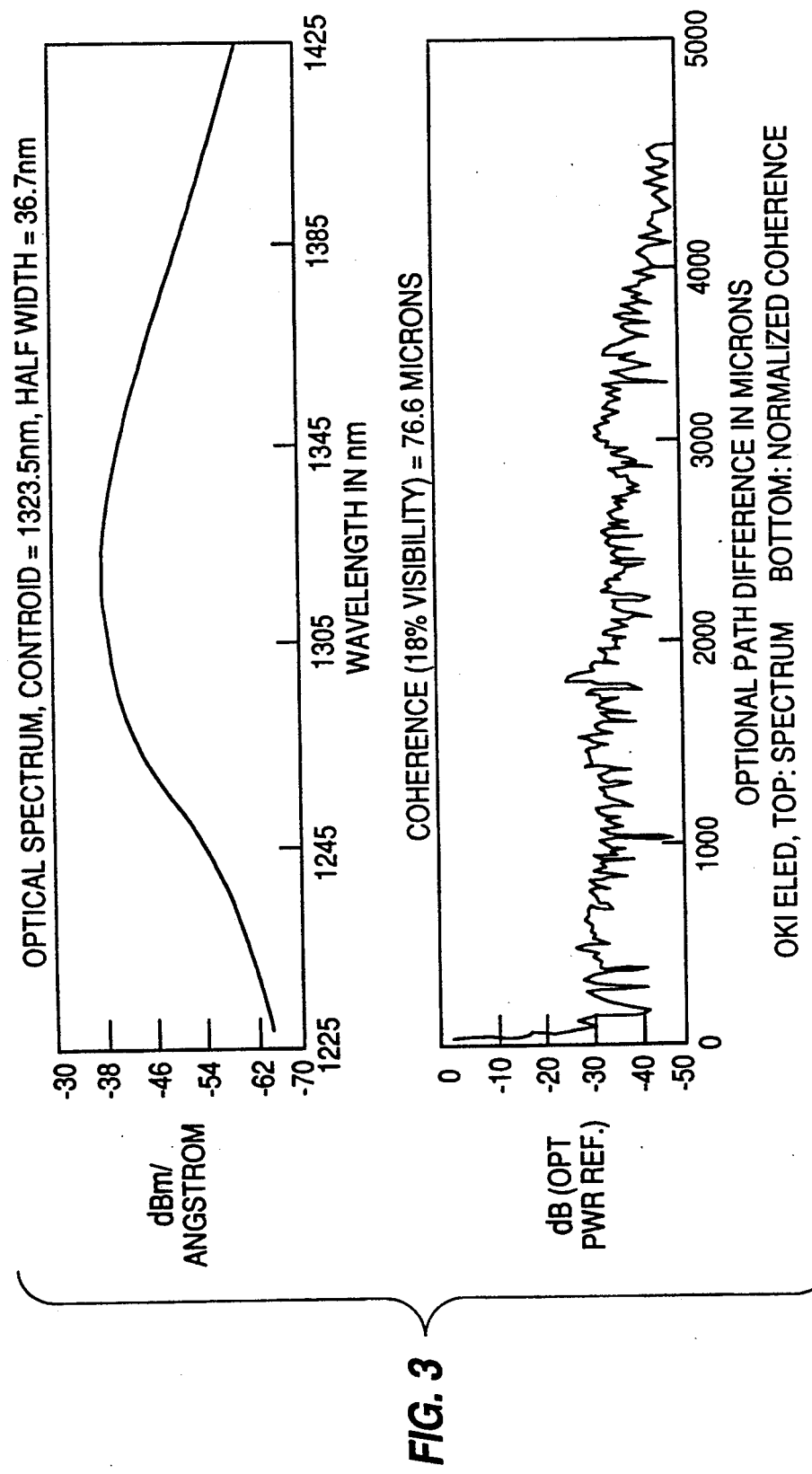
FIG. 3 shows plots of the optical spectrum and coherence function of an optical source used in the present invention.

In recent years, however, an LED type device has been developed which overcomes the power coupling problem. It is called an edge light emitting diode (ELED). It has a very small emitting diameter, typically 2-4 microns. The spectrum and coherence (visibility) of an ELED device are shown in FIG. 3. This particular ELED device is manufactured by OKI and has a model number OE352G-010. When driven at 90 mA, it produces a power output at 25° C. of 150 microwatts from the fiber pigtail. It is clear from the optical spectrum that this device is not a white light device. The peak power occurs around a wavelength of 1320 nm with power falling off by 30 dB (1000X) for 100 nm wavelength variation in either direction. The normalized coherence or visibility function is shown below the spectrum in FIG. 3. It is plotted against optical path length difference in microns. If $2d_1$ and $2d_2$ for the optic sensor system of FIG. 1 are selected to be 120 microns or greater, and matched to within 15 microns of each other, then Equation III would be a valid equation because the visibility for the interference terms 1,2,3,5 and 6 would be 0.001 or less and the visibility for term 4 would be close to 1. From this example, it can be seen that the ELED has clearly demonstrated that it is an excellent source for coherence selective sensors.

The preferred optical source which is capable of delivering more power than the ELED, but having similar characteristics, is the super luminescent diode (SLD). This type of optical source is constructed like a laser diode, but an optical absorber is built (processed) in-between the two laser facets. This absorber defeats the round trip cavity gain enough to prevent lasing, but with the addition of the reflection of the back facet, the device becomes a "super fluorescent" device, producing more output power than a standard ELED. SLD devices have the capability of delivering up to 350 micro-watts into a single mode fiber. Some selected SLD devices can deliver over 500 micro-watts. These sources are also available from OKI, for example.

The pertinent optical parameters for the coherence selective sensor 1 are the loss budget of the optical configuration, including fiber splices, connectors, component loss and the relative intensity noise ($R_{in}$) of the optical source. The optical loss budget for each of the four Paths listed in (I) is approximated in Table 1. The reflections from surfaces 8 and 16 are 25% while reflections from surfaces 9 and 17 are 100%. The mode overlap loss between the optical mode for light being back reflected from either the sensor or the reference transducer into the fiber and the propagating mode of that fiber is approximately 3 dB.

TABLE 1

| Optical Loss Prediction for Four Optical Paths | | | | |
|---|---|---|---|---|
| | Path 1 | Path 2 | Path 3 | Path 4 |
| Config. Power split (double pass) | −12.0 | −12.0 | −12.0 | −12.0 |
| Reflections | −11.0 | −11.5 | −11.5 | −12.0 |
| Connector (double pass) | −2.0 | −2.0 | −2.0 | −2.0 |
| Coupler Loss (double pass) | −1.0 | −1.0 | −1.0 | −1.0 |

The four fiber optic splice locations will be between the optical source 1 and coupler 3, between coupler 3 and coupler 11, between coupler 11 and the reference transducer 15 and between coupler 11 and the detector 18. The splice between coupler 11 and the reference transducer 15 will be double passed, making a loss equivalent to 5 splices.

The coherence selective sensor system configuration shown in FIG. 1 is one which allows the combination of a remote "all fiber" sensor and a local optical processor (including the reference transducer) to constitute a single interferometric entity. Both of the optical paths are present in the argument of the cosine term of Equation III. This means that any change in the path length of the sensor 6 or the reference transducer will change the phase of the interference signal. The reference path is adjusted to maintain interferometric quadrature.

A servo system employed to maintain interferometric quadrature is shown in FIG. 1. The servo system guarantees that the interferometer will always be operating in its linear range. The optical signal generated from the interference described in Equation III, is detected as an amplitude signal on the detector 18, which is preferably a photodetector, and amplified by an amplifier 20. The signal is then multiplied in mixer 22 with the signal from a local oscillator 24. The output of mixer 22 is a base band signal 25 combined with unwanted harmonics of the signal from the local oscillator 24. The base band signal 25 is filtered with loop filter 26 which optimizes the closed loop transfer function of the servo. The loop filter 26 also removes any signals or harmonics associated with the local oscillator frequency. The filtered signal may then be amplified by amplifier 28.

A dither signal is applied to the servo as a means to determine whether or not the interferometer is in quadrature. This dither signal has a frequency well above the frequency range of interest for the sensor, and is generally sinusoid. A complete discussion of this type of interferometric servo system can be found in Bush et al., "Synchronous phase detection for optical fiber interferometric sensors", Applied Optics, Vol. 22, No. 15, at p. 2329 (Aug. 1, 1983). If a linear reference transducer 15 is used in the servo, the voltage feedback signal 30 (to the reference transducer 15) will be linearly proportional to the entire phase of the interferometer. This feedback voltage will linearly track the sensor displacement (and optical phase) and is thus a replica of the desired signal.

In the preferred embodiment, the transducer 15 consists of a mirror, attached to a piezoelectric actuator; for example, Tokin America NLA-2×3×9 and NLA 2×3×18. The physical construction of the transducer is similar to that of the sensor. The piezoelectric actuators act as devices to produce a proportional mechanical displacement for a given input signal. The first actuator 17 generates the optical dither signal while second device 32 provides the feedback element for the servo system. The advantage of using two actuators is that a smaller actuator with a higher resonant frequency can be used for the dither signal while a large actuator with a larger displacement per volt can be used for the feedback loop. Although these devices are incorporated into the preferred embodiment, any device including mechanical, magnetic, hydraulic, etc., could be used for the transducer element in alternate configurations. An alternate configuration would use a single piezoelectric actuator in place of the devices 17 and 32. In such case, the signal from the local oscillator may be combined with the servo signal 30 in a summer with the combined signal fed back to the single piezoelectric actuator.

To more easily understand the optical parameters which determine system performance, the electronic servo system will be considered as a "noiseless" system. In practice, this is a good assumption when the quiescent optical level on the detector 18 is greater than one micro-watt. A well used measure for determining optical performance of an interferometric sensor is to describe the minimum detectable (dynamic or ac) phase shift normalized to a 1 hertz resolution (or noise equivalent) bandwidth. If we assume Equation III holds for the coherence selective sensor system, and an optical power can be specified for the pigtailed optical source, the minimum detectable phase shift for the optical system may be predicted. From Table 1, the background intensity is determined from the first four terms in Equation III. This intensity level can be identified as an equivalent loss term when referenced to the optical source. Taking the loss terms from Table 1, the equivalent loss (from source to detector) is determined to be 21.5 dB. Alternately, this means that the dc intensity level seen on the detector will be 0.071% of the source intensity. It is this quiescent level which produces the (assumed shot) noise floor of the system. In order to equate this noise to a phase shift, the full fringe intensity for the interfering terms needs to be calculated. From Equation III and Table 1, the intensity produced by a $\pi/2$ phase shift is approximated to be 1/6 that of the dc quiescent term. This would represent an equivalent loss (for the peak signal) of approximately 29.3 dB. If this number is scaled for an rms value, it becomes a 32.3 dB loss. This is all the information required to determine the minimum detectable phase shift.

The minimum detectable phase is listed in Table 2 for sources ranging from 100 to 4000 micro-watts. The calculation was made by determining the shot noise created by the quiescent offset and taking the ratio of it to the signal produced by a $\pi/2$ interferometric phase shift. Since the interferometer is linearized by the servo, this optical signal represents one radian.

TABLE 2

| OPTICAL POWER | MINIMUM DETECTABLE PHASE (rms per root hz) |
|---|---|
| 100 µW | 8.5 µrad |
| 200 µW | 6.0 µrad |
| 300 µW | 4.9 µrad |
| 400 µW | 4.2 µrad |
| 500 µW | 3.8 µrad |
| 750 µW | 3.1 µrad |
| 1000 µW | 2.7 µrad |
| 2000 µW | 1.9 µrad |
| 4000 µW | 1.3 µrad |

Table 2 shows the expected square root dependence with the input optical power. It is interesting to note that if a multi-longitudinal line laser diode had the proper coherence nulls in its visibility function, it could produce a minimum detectable performance of less than 2 micro-radians. In order to do this, the laser diode would have to have a relative intensity noise measurement less than $-120$ dB. Performance equivalent or better than this number for devices operating at 1.3 micron wavelengths is available. See Chen et al., and "Short-coherence-length and high-coupling-efficiency pulsed diode laser for fiber optic sensors," Optics Letters, Vol. 13, No. 8 at p. 628 (August 1988).

Figure 4:
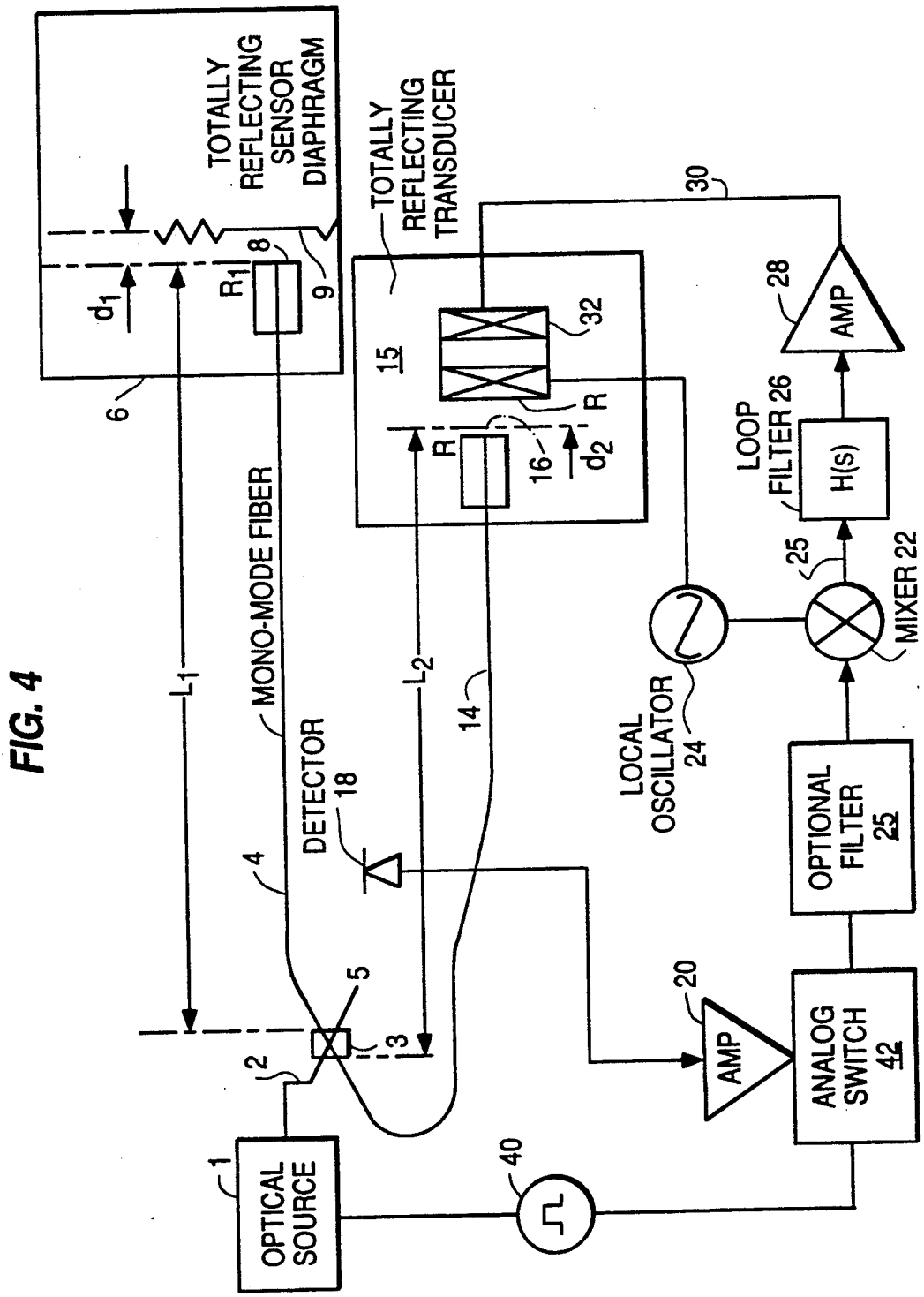
FIG. 4 shows a block diagram of a variant on the fiber optic sensor system of the invention.

An alternative configuration shown in FIG. 4 of the fiber optic interferometric sensor system consists of eliminating coupler 11. In this configuration, the fiber 14 extends from coupler 3 to the reference transducer 15. Detector 18 is connected to the end of fiber 5. In this configuration, for CW operation of the optical source 1, a large light level establishes a high noise floor on the detector 18 due to the direct coupling from the optical source 1 to the detector 18; thus reducing the signal to noise ratio.

The optical source is gated with pulse source 40 at approximately a 50 per cent duty cycle. The frequency is chosen such that for the combined lengths $L_1$ and $L_2$, the return pulse from the sensor and transducer arrives at detector 18 at a different time than for the light directly coupled from the source 1. Thus, although the signal out of the optical source is on only 50 per cent of the time, the output of the detector is continuous. The received signal is then gated so that the detector output is only measured during the presence of the return signal of interest form the sensor and transducer. This is achieved with analog switch 42. The switch is only at the appropriate pulse arrival time. An optional filter can be used to filter out high frequency switching noise prior to the mixer. As an example, if the combined length of the fibers $L_1$ and $L_2$ are 20 meters greater than the direct path from the optical source, a 10 MHz modulation of the source and sampling rate would provide the correct output. This rate is easily achieved for commercially available optical sources. Longer lengths would require lower modulation frequencies. A start-up auto calibration is employed to adjust the modulation frequency to correct value for a given sensor length. The peak output power of the optical source 1 can be higher under these conditions than for CW operation, as long as the average power remains constant. This configuration provides 3 dB lower loss than that of FIG. 1 due to the elimination of one trip through an optical coupler.

While a presently preferred embodiment of practicing the invention has been shown and described with particularity in connection with the accompanying drawings, the invention may otherwise be embodied within the scope of the following claims.

What is claimed is:

1. A fiber optic interferometric sensor system for optically sensing displacements over a large dynamic range with high linearity, comprising: an optical source with a short coherence length; a remotely located fiber optical sensor having a path length difference between a first reflector located on the end of a first optical fiber and a second optically reflective surface, the path length being much larger than the coherence length of light from the optical source; a locally located fiber transducer having a pathlength difference between a first reflective surface located on the end of a second optical fiber and a second optically reflective surface, which pathlength matches that of the sensor; the sensor and transducer being connected together with intervening fiber such that they form a single fiber optic interferometer, a coupler for passing light from said optical source to said first optical fiber, and a second coupler arranged in said intervening fiber to receive a portion of the light from said optic interferometer and pass that portion to a detector.

2. The interferometric sensor system as described in claim 1 wherein the optical source comprises a light emitting diode and the distance between the reflecting surfaces of the sensor and reference is beyond the coherence length of the light emitting diode.

3. The interferometric sensor system as described in claim 1 wherein the optical source comprises a super luminescent diode and the distance between the reflecting surfaces of the sensor and reference is beyond the coherence length of the super luminescent diode.

4. The interferometric sensor system as described in claim 1 wherein the optical source comprises a multi-longitudinal line laser and the distance between the reflecting surfaces of the sensor and reference is beyond the coherence length of the multi-longitudinal line laser.

5. The interferometric sensor system as described in claim 1 wherein the remotely located optical sensor includes an optical coating to enhance the optical reflectivity on an end of said first optical fiber and a reflective surface spaced from said fiber such that the reflections are incoherent at the fiber end and arranged to reflect light back to said fiber, said reflective surface being mounted to sense movement and to be displaced thereby.

6. The interferometric sensor system as described in claim 5 wherein the fiber optic is mounted within a first capillary provided with a partially reflective surface to reflect some light from the source back along the fiber and the reflective surface is on a second capillary mounted coaxially with said first capillary for axial displacement relative thereto.

7. The interferometric sensor system according to claim 6 wherein quasi-static pressure relief is afforded to said second capillary by providing a small hole or tube which act as a low pass pressure filter thus providing a sensor with only a dynamic response.

8. The interferometric sensor system described in claim 1 wherein the coherence length of the optical source is such that the double pass separation between reflectors is between 80 and 120 microns.

9. The interferometric sensor system as described in claim 1 wherein a servo system is used to adjust the reference transducer and maintain linearity to a phase difference with respect to the sensor of either $(2n+1)\pi/2$ or $n\pi$ radians.

10. The interferometric sensor system as described in claim 9 wherein a piezoelectric actuator is used in the reference transducer and spaced to reflect light back into said second fiber, and wherein said activator is connected in said servo system to be activated by a signal therein.

11. The interferometric sensor system as described in claim 10 wherein a dither signal is generated in said actuator.

12. The interferometric sensor system as described in claim 9 wherein the servo system comprises, in series, a first amplifier, a mixer, a loop filter, a second amplifier and a summer, the mixer having one input from the first amplifier and a second input from a local oscillator, and the summer having one input from the second amplifier and a second input from the local oscillator.

13. A fiber optic interferometric sensor system for optically sensing dynamic displacements over a large dynamic range with high linearity comprising: an optical source of short coherence length; a remotely located fiber optic sensor for optically sensing displacements; a fiber transducer locally located with respect to said source to provide an optical reference signal; fiber optics including at least one coupler connecting said source to said sensor and said reference transducer and arranged to produce an optical phase shift in a signal from the source by proportional displacement of reflecting surfaces in the sensor and the transducer; and a servo system including a detector arranged to detect the optical signal produced in the interferometric sensor connected to the reference transducer and arranged to maintain a constant static phase shift between the sensor signal and reference transducer signal of $(2n+1)\pi/2$ or $n\pi$.

14. The interferometric sensor system as described in claim 13 wherein the optical source is pulsed and wherein an optical delay is included in arrival of unused light from the optical source and the signal at the detector.

15. The interferometric sensor system as described in claim 14 wherein the optical source comprises a light emitting diode.

16. The interferometric sensor system as described in claim 14 wherein the optical source comprises a super luminescent diode.

17. The interferometric sensor system as described in claim 14 wherein the optical source comprises a multi-longitudinal line laser.

18. The interferometric sensor system described in claim 14 wherein the coherence length of the optical source such that the double pass separation between reflectors is between 80 and 120 microns.

19. The interferometric sensor system according to claim 14 wherein the detector and the pulse source are connected in a servo system through an analog switch, and the switch is closed to get only a signal and not excess noise on the detector to the reference transducer.

20. The interferometric sensor system of claim 18 wherein the servo system induces a source of dither signals applied to the reference transducer.

21. The interferometric sensor system of claim 19 wherein the reference transducer includes two piezoelectric actuators, and wherein the one actuator is connected to be activated by the signal in the servo system and the other actuator is biased by a locally generated sinusoid signal to provide a dither.

22. A method for optically sensing dynamic displacements over a large dynamic range with high linearity comprising the steps of:

(a) using an optical source of low coherent light to generate optical signals which are not coherent when subject to small path length differences;
(b) propagating the low coherent light through a fiber optic to a remotely located fiber sensor;
(c) reflecting the light twice in the sensor, once from a partial reflection at the tip of a fiber optic and secondly from a highly reflective surface, in a manner to provide a phase displacement without coherence between the beams with the information of interest;
(d) propagating the phase displaced optical information to a reference transducer and reflecting the light twice in a fiber reference transducer to produce a coherent interferometric optical signal by matching pathlength differences between the reflecting light in the reference transducer with those from the remote sensor to within an arbitrary difference of $(2n+1)\pi/2$ or $n\pi$; and
(e) detecting the interferometric optical signal and applying it to control the reference transducer.

23. A dynamic displacement sensor for use with an interferometric sensor system comprising a partially reflective optical member associated with a tip or end of a fiber optic to repropagate light in said fiber optic and to transmit light to a second optical reflective member, said second reflective member being mounted at a distance considerably longer than the coherence length of the optical source and for displacable movement with respect to said partially optical reflective member and located to reflect light to said fiber optic of repropagation through the fiber.

* * * * *